H. M. HICKMAN.
GRAIN DOOR.
APPLICATION FILED MAY 6, 1908.
947,063.
Patented Jan. 18, 1910.
2 SHEETS—SHEET 1.
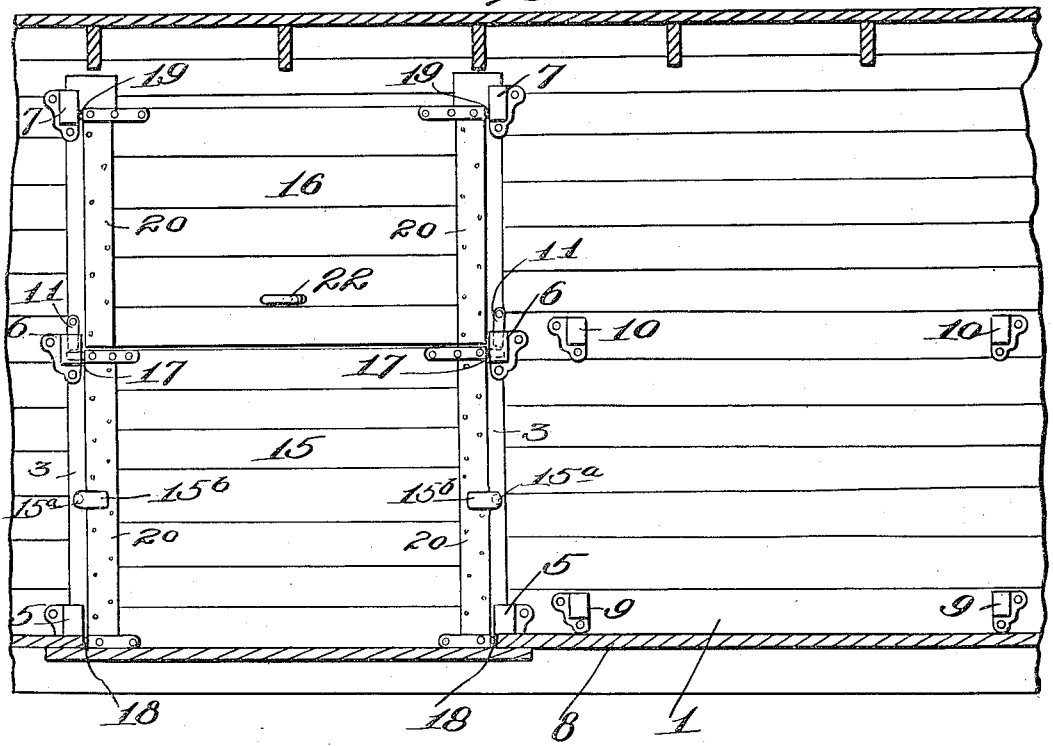
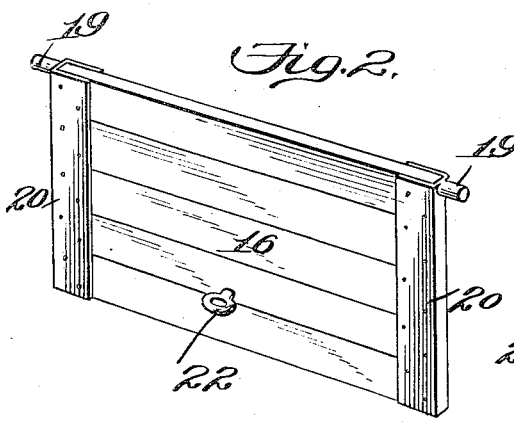
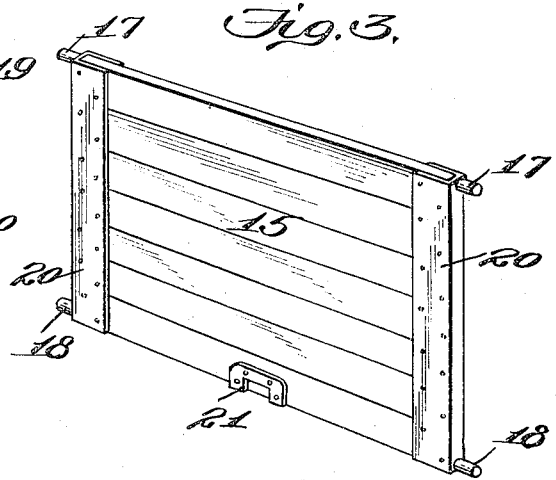
Witnesses:
Inventor
Hezekiah M. Hickman
By James L. Norris
Atty.

H. M. HICKMAN.
GRAIN DOOR.
APPLICATION FILED MAY 6, 1908.
947,063.
Patented Jan. 18, 1910.
2 SHEETS—SHEET 2.
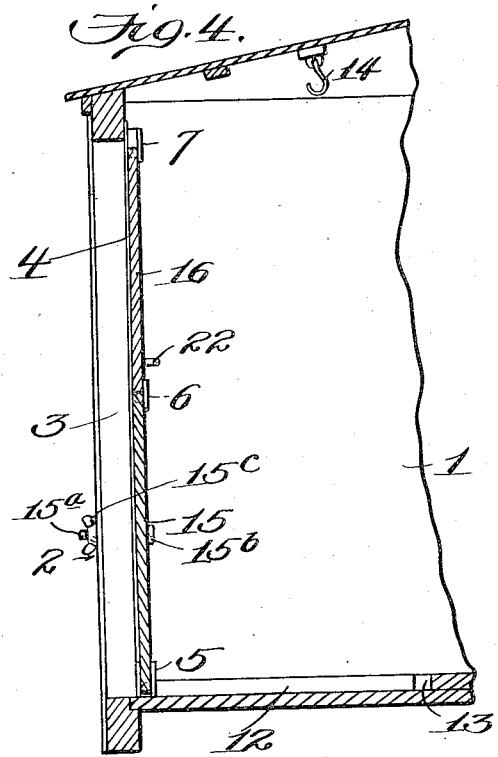
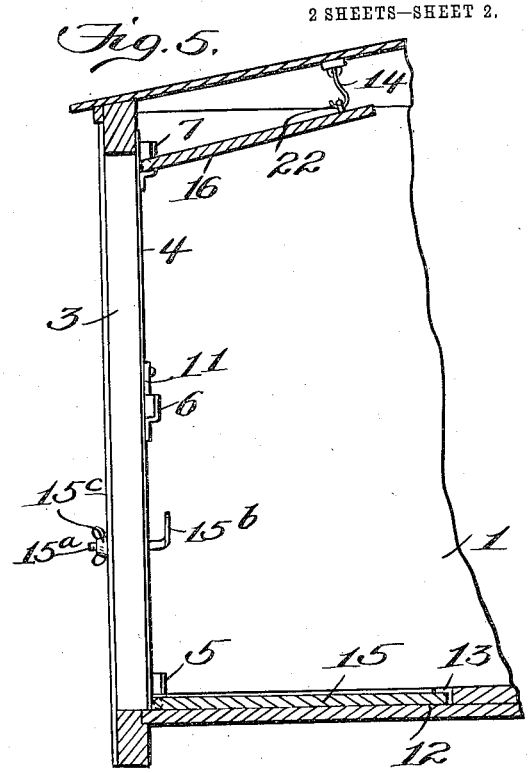
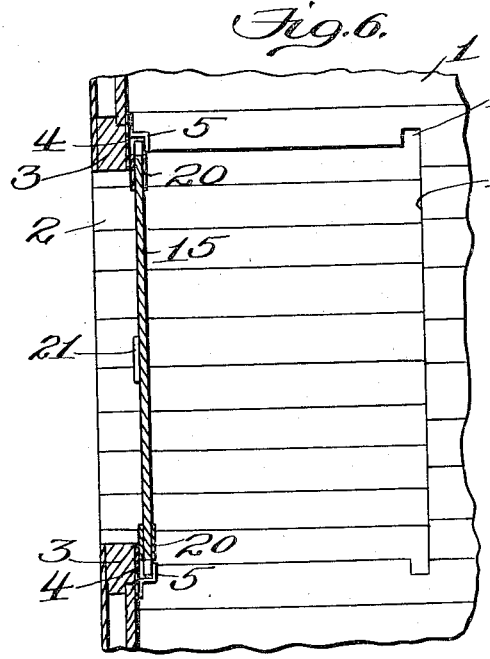
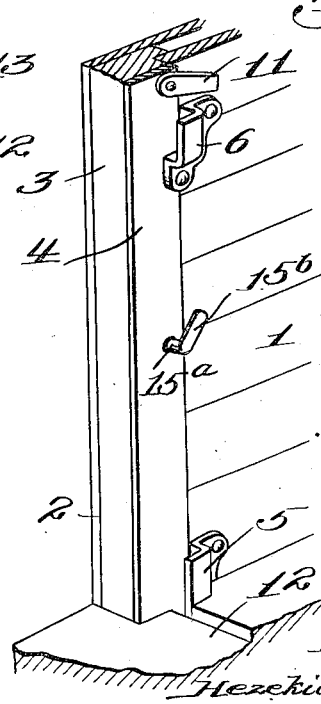
Witnesses:
Inventor
Hezekiah M. Hickman
By James L. Norris.
Atty.

UNITED STATES PATENT OFFICE.

HEZEKIAH M. HICKMAN, OF WELLINGTON, KANSAS.

GRAIN-DOOR.

947,063.  Specification of Letters Patent.  Patented Jan. 18, 1910.

Application filed May 6, 1908. Serial No. 431,240.

*To all whom it may concern:*

Be it known that I, HEZEKIAH M. HICKMAN, a citizen of the United States, residing at Wellington, in the county of Sumner and State of Kansas, have invented new and useful Improvements in Grain-Doors, of which the following is a specification.

This invention relates to a closure means for a car door opening and known in the art as a grain door for use in facilitating loading of a box car or any other analogous carrying means without liability of leakage or escape of the grain through joints between the door and the jamb and also expediting unloading operations.

The primary object of the invention is to provide a grain car door of a simple and effective construction capable of being applied without interfering with the exterior closure of the car door opening and also adapted to have the parts thereof placed in such positions when not in use as to fully clear the door opening and avoid obstructions of a material nature within the car.

A further object of the invention is to cheapen the cost of equipping a grain car with a convenient form of grain door and at the same time preserve desirable characteristics of strength and durability.

With these and other objects and advantages in view the invention consists in the construction and arrangement of the several parts which will be more fully hereinafter specified in preferred form.

In the drawing: Figure 1 is a longitudinal vertical section of a portion of a car looking toward the interior thereof and showing the improved grain door applied in operative position. Figs. 2 and 3 are detail perspective views of the parts of the grain door. Fig. 4 is a transverse vertical section of a portion of a car and the grain door, the latter being shown closed. Fig. 5 is a view similar to Fig. 4 showing the parts of the door open. Fig. 6 is a horizontal section through a portion of a car and the lower part of the grain door. Fig. 7 is a detail perspective view of a portion of a car looking toward the interior thereof at the door opening.

Similar characters of reference are employed to indicate corresponding parts in the several views.

The numeral 1 designates a car of any usual construction or analogous vehicle adapted to carry grain and provided with a door opening 2 with which any suitable exterior closing means may coöperate. The jamb 3 of the door opening is preferably provided with a metal sheathing or covering 4 to increase the wearing qualities thereof and facilitate the formation of a tight joint with the parts of the improved door which will be presently explained. At regular intervals on the interior of the door jamb are transversely alined pairs of brackets or sockets 5, 6 and 7, the brackets or sockets 5 being close to the floor 8 of the car, the brackets or sockets 6 at an intermediate point, and the brackets or sockets 7 at the upper or top portion of the jamb, as clearly shown by Fig. 1. These brackets or sockets all have seats which are fully open at the top and at their inner opposing sides, and on the inner wall of the car body lower and intermediate pairs of similar sockets 9 and 10 are secured. The sockets 9 and 10 are located a short distance from the door opening 2 and are preferably on the right side of the latter looking from the interior of the car. Over the intermediate brackets or sockets 6, fastening devices 11 are arranged, and in the present instance are in the form of simple gravity latches. In the floor 8 of the car from the door opening 2 inwardly a suitable distance a recess 12 is formed having a depth sufficient to receive the lower portion of the grain door so that the latter may be flush with the floor of the car, the recess 12 having its inner wall extended beyond the end walls to form counter-recesses 13. In the top of the car or secured to the roof is a pendent hook or analogous device 14 for suspending the upper portion of the improved grain door.

The grain door comprises a lower door member 15 and an upper door member 16, the latter being slightly less in vertical extent or width than the door 15. The lower door member 15 at the upper and lower corners or extremities has outwardly projecting trunnions 17 and 18 which are adapted to removably engage the brackets or sockets 6 and 5 respectively. Hook bolts 15$^a$ are also provided and extend through the door frame at each side of the door opening and have inner broadened hook extremities 15$^b$ to engage the intermediate portion of the door member 15 to prevent the latter from springing or bulging and thus obviate escape of grain. The outer screw-threaded ends of the bolts 15$^a$ have clamping nuts 15ᶜ applied thereto to tighten them up. The upper door member 16 has upper trunnions 19 to removably engage the brackets or sockets 7. Both door members are provided with end metallic sheathings 20 to increase the strength and wearing characteristics of the same and form a tight joint with the metallic sheathings 4 of the door jamb. The door member 15 at the center of its outer side and at the lower edge has a recessed metal guard 21 forming a socket into which a prying bar or analogous means may be inserted for forcing the door member upwardly and to permit ready removal of the said door member with the resistance thereagainst of the grain weight. The upper door member 16 at the inner side and near the lower edge is provided with an eye 22 for engagement with the hook or suspending member 14.

In applying the improved grain door, the lower door member 15 is vertically disposed against the inner side of the jamb 3 high enough to permit the trunnions 17 and 18 to enter the upper open extremities of the brackets or sockets 6 and 5, a release of the door member 15 when in this position causing the trunnions 17 and 18 to gravitate to and rest against the bottoms of the sockets of the brackets 6 and 5, and as the latter brackets have the bottoms of their sockets flush with the floor of the recess 12 or approximately in the same plane as the floor of the recess, the lower edge of the door member will evenly and closely contact with the said floor of the recess adjacent to the door opening 2. The upper door member 16 is also disposed vertically and raised high enough to permit the trunnions 19 thereof to enter the brackets or sockets 7, the door members being so proportioned in relation to the position of the brackets or sockets that when the upper door member 16 is in place the lower edge thereof will closely contact with the upper edge of the lower door member 15. To prevent the lower door 15 from being raised from the exterior and displacing the upper door member 16, particularly by unauthorized persons, the latches or locking means 11 are employed and turn down into the sockets 6 over the trunnions 17, as shown by Fig. 1, the said locking means being easily displaced from locking position when found necessary from the exterior of the door member 15 and after the door member 16 has been pushed inwardly and raised from engagement over the said door member 15. At times the lower door member 15 may be used alone when the contents of the car are such as to warrant or require only a partial closure of the door opening, and in this event the door member 16 will be swung upwardly and the eye 22 engaged by the suspending means or hook 14, as shown by Fig. 5. Furthermore, when the load in the car is in such condition as to demand a full clearance of the door opening 2, or when it is unnecessary to dispose the door members in operative position with relation to the said door opening, the lower door member 15 may be let down into the recess 12 flush with the floor of the car, the trunnions 17 then occupying the counter-recesses 13. In this operation of the lower door member 15 it will be necessary to disengage the upper trunnion 17 from the brackets or sockets 6 by slightly raising the lower door member 15, the lower brackets or sockets 5 being deeper than the brackets or sockets 6 to an extent sufficient to permit the upper trunnions 17 to be released from the brackets or sockets 6 without fully disengaging the trunnions 18 from the brackets or sockets 5. The lower door member 15 may also be fully disengaged from both pairs of sockets 5 and 6, and the trunnions 18 and 17 disposed in the sockets 9 and 10 respectively so that the said door member will always be in convenient position in either operation for ready application to the lower part of the door opening 2.

The hook bolts 15ᵃ can be readily manipulated to release the door member 15 by simply loosening the clamping nuts 15ᶜ and turning the said bolts and the inner broadened extremities 15ᵇ to disengage the latter from opposite sides of the intermediate portions of the said door member. These hook bolts will always be in position for immediate use and will not interfere with a convenient operation of the door members.

The bolts 15ᵃ constitute clamps which are very effective in holding the intermediate portions of the door section with which they engage closely against the door frame, and at times will obstruct any tendency to endwise movement of the door section. These clamp bolts will also be found exceptionally advantageous in holding a temporary door closure in place independently of the trunnions and sockets hereinbefore explained.

From the foregoing it will be observed that the improved grain door may be readily arranged within the car; and while the improved door is particularly adapted to serve as a closing means for a grain car, it will be understood that it is applicable to cars for containing other materials in bulk. Moreover, the number of coöperating parts of the door is reduced to a minimum and will not be readily broken or get out of order. The construction is so simple that the improved door may be readily applied to cars now in use, and it will be understood that variations in the proportions, dimensions and minor details may be resorted to without departing from the spirit of the invention.

Having thus described the invention, what is claimed as new, is:

1. The combination with a car having a do‿ ‿ening, of sockets arranged in pairs on opposite sides of the opening at the inner part of the car, and door members having trunnions movably and removably engaging the sockets, the lower door member being provided with trunnions at the upper and lower extremities thereof and the upper door member having trunnions solely at the upper extremity of the same.

2. The combination with a car having a door opening, of transversely alined pairs of sockets on opposite sides of the opening within the car, similar sockets arranged in transversely alined pairs on the inner side of the wall of the car adjacent to the door opening, and upper and lower door members having trunnions to movably and removably engage the sockets, the upper door member being provided with trunnions at the upper extremity solely thereof, and the lower door member having trunnions at both the upper and lower extremities of the same and adapted to removably engage the sockets on the inner side of the wall of the car at a distance from the door opening.

3. The combination with a car having a door opening, of transversely arranged pairs of sockets applied against the inner side of the door opening at different elevations, upper and lower grain door members applied to the interior of the door opening and having trunnion means at the end edges engaging said pairs of sockets, the sockets differing in depth so that the trunnion means of both door members may be either fully removed from the sockets or a portion only of the trunnion means of one door member removed from a part of the sockets while the remaining portion of the trunnion means of the same door member is held in engagement with coöperating sockets by slightly elevating the latter door member to swing the last named door member, and means for securing the door members against movement.

4. A car having a door opening and a floor recess adjacent to said opening, transversely arranged pairs of sockets open at the top and disposed at the upper, lower and intermediate portions of the door opening, grain door members movably and removably coöperating with said sockets, the upper door member having trunnions at the opposite end edges near the top edge and the lower door member having trunnions at the opposite end edges near both the upper and lower side edges, the lowermost pair of sockets being deeper than the remaining sockets and the lower pair of trunnions movable in said lower sockets to disengage the trunnions adjacent to the upper side edge of the lower door member from the intermediate sockets to swing the lower door member downwardly into the floor recess, and securing means for the lower door member.

5. A car having a door opening and a recess extending inwardly from the opening and formed in the car floor, sockets arranged in transverse pairs against the inner side of the door opening, the lower pair of sockets having a greater depth than those above, and a door member having upper and lower outwardly projecting trunnions engaging the pairs of sockets and movable vertically to disengage the upper trunnions from the upper pair of sockets without disconnecting the lower trunnions from the lower pair of sockets, the door member being movable downwardly into the floor recess.

6. A car having a door opening and a floor recess extending inwardly from the said opening, sockets arranged in transversely alined pairs at the inner side of the door opening, other sockets arranged in transversely alined pairs against the inner side of the wall of the car adjacent to the door opening, and a door member having trunnions at the upper and lower extremities to removably and movably engage the said pairs of sockets, the door member being movable downwardly into the floor recess.

7. The combination with a car having a door opening, of sockets arranged in pairs on opposite sides of the opening at the inner part of the car, hook bolts disposed in intermediate relation to the sockets, and a door member having upper and lower trunnions movably and removably engaging the sockets and adapted to be intermediately engaged by the hook bolts.

In testimony whereof I have hereunto set my hand in presence of two subscribing witnesses.

HEZEKIAH M. HICKMAN.

Witnesses:
D. D. WEBSTER,
W. A. HARPER.